US011741223B2

(12) United States Patent
Aldridge (10) Patent No.: US 11,741,223 B2
(45) Date of Patent: Aug. 29, 2023

(54) VALIDATION OF NETWORK HOST IN EMAIL (71) Applicant: International Business Machines Corporation, Armonk, NY (US)

(72) Inventor: Mamie B. Aldridge, Smyrna, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 599 days.

(21) Appl. No.: 16/597,497

(22) Filed: Oct. 9, 2019

(65) Prior Publication Data
US 2021/0110029 A1    Apr. 15, 2021

(51) Int. Cl.
G06F 17/00    (2019.01)
G06F 21/54    (2013.01)
G06F 40/103   (2020.01)

(52) U.S. Cl.
CPC ............ G06F 21/54 (2013.01); G06F 40/103 (2020.01); *G06F 2221/033* (2013.01)

(58) Field of Classification Search
CPC ... G06F 21/54; G06F 40/103; G06F 2221/033
See application file for complete search history.

(56) References Cited

U.S. PATENT DOCUMENTS

| 6,615,242 | B1  |     | 9/2003  | Riemers |             |
|-----------|-----|-----|---------|---------|-------------|
| 8,332,947 | B1  | *   | 12/2012 | Bregman | H04L 63/1433 |
|           |     |     |         |         | 726/25      |
| 9,338,181 | B1  | *   | 5/2016  | Burns   | H04L 63/1433 |
| 11,075,930| B1  | *   | 7/2021  | Xavier  | H04L 63/20  |
| 11,089,061| B1  | *   | 8/2021  | Sinha   | H04L 51/12  |
| 2003/0231207 | A1 | * | 12/2003 | Huang   | H04L 51/12  |
|           |     |     |         |         | 715/752     |
| 2006/0288076 | A1 |   | 12/2006 | Cowings et al. | |
| 2007/0244977 | A1 |   | 10/2007 | Atkins  |             |
| 2008/0028446 | A1 |   | 1/2008  | Burgoyne |            |
| 2008/0172738 | A1 | * | 7/2008  | Bates   | H04L 63/1483 |
|           |     |     |         |         | 726/22      |
| 2008/0222728 | A1 | * | 9/2008  | Chavez  | H04L 63/1416 |
|           |     |     |         |         | 726/24      |
| 2010/0043071 | A1 | * | 2/2010  | Wang    | G06F 21/51  |
|           |     |     |         |         | 726/22      |

(Continued)

FOREIGN PATENT DOCUMENTS

JP    2008510321 A    4/2008

*Primary Examiner* — Mohammed H Zuberi
(74) *Attorney, Agent, or Firm* — Troutman Pepper Hamilton Sanders LLP (57) ABSTRACT Embodiments provide a method for validating a network host listed in a body of an email. The method includes: receiving, by the processer, the email; checking, by the processer, whether a threat analytics option is enabled. If the threat analytics option is enabled, the method further includes: copying, by the processer, an original body field of the email into a new body field; converting, by the processor, a text representation of the network host into a link in the new body field; modifying, by the processer, a text style of the link in the new body field according to a threat analytics result from a threat analytics service; and displaying, by the processer, the email with the new body field, wherein the email includes the link having a modified text style.

20 Claims, 8 Drawing Sheets (56) References Cited

U.S. PATENT DOCUMENTS

| | | | |
|---|---|---|---|
| 2011/0185024 A1 | 7/2011 | Ramarao | |
| 2013/0117809 A1* | 5/2013 | McDougal | G06F 21/567 |
| | | | 726/1 |
| 2014/0181216 A1 | 6/2014 | Liebmann | |
| 2015/0026813 A1* | 1/2015 | Wang | H04L 63/1433 |
| | | | 726/25 |
| 2015/0350134 A1 | 12/2015 | Yang et al. | |
| 2016/0014151 A1* | 1/2016 | Prakash | G06N 7/005 |
| | | | 726/22 |
| 2016/0036829 A1* | 2/2016 | Sadeh-Koniecpol | |
| | | | H04L 63/1491 |
| | | | 726/23 |
| 2017/0078321 A1* | 3/2017 | Maylor | H04L 63/1433 |
| 2017/0180378 A1* | 6/2017 | Tyler | H04L 63/0254 |
| 2017/0344743 A1* | 11/2017 | Shi | G06F 21/577 |
| 2019/0020682 A1* | 1/2019 | Edwards | H04L 51/18 |
| 2019/0260769 A1* | 8/2019 | Sharon | H04L 63/1416 |
| 2020/0137110 A1* | 4/2020 | Tyler | H04L 63/1483 |
| 2020/0329060 A1* | 10/2020 | Bergström | G06F 21/53 |
| 2021/0211462 A1* | 7/2021 | Birch | H04L 63/0236 |

* cited by examiner

SAMPLE EMAIL BODY FOR THREAT ANALYTICS OPTION DISABLED:

Hi User One,

I received an error when trying to generate a report on the server ghost3.examplelab2.com. Can you please review the log files and let me know if you can resolve the problem?

SAMPLE EMAIL BODY FOR THREAT ANALYTICS OPTION ENABLED, IBM XFORCE EXCHANGE SELECTED, and HIGH RISK SCORE:

Hi User One,                                                                                              Red color I received an error when trying to generate a report on the server ghost3.examplelab2.com. Can you please review the log files and let me know if you can resolve the problem?

FIG. 5

SAMPLE EMAIL BODY FOR THREAT ANALYTICS OPTION DISABLED:

Hi User One,

I received an error when trying to generate a report on the server ghost3.examplelab.com. Can you please review the log files and let me know if you can resolve the problem?

SAMPLE EMAIL BODY FOR THREAT ANALYTICS OPTION ENABLED, IBM XFORCE EXCHANGE SELECTED, and LOW RISK SCORE:

Hi User One,

I received an error when trying to generate a report on the server ghost3.examplelab.com. Can you please review the log files and let me know if you can resolve the problem?

Green color

FIG. 6

SAMPLE EMAIL BODY FOR THREAT ANALYTICS OPTION DISABLED:

Hi User One,

One of the IP Addresses for CNN is 151.101.205.67.

SAMPLE EMAIL BODY FOR THREAT ANALYTICS OPTION ENABLED, IBM XFORCE EXCHANGE SELECTED, and LOW RISK SCORE:

Hi User One,

One of the IP Addresses for CNN is 151.101.205.67. — Green color

> https://exchange.xforce.ibmcloud.com/ip/
> 151.101.205.67
> Risk Score: 1
>
> Click or tap to follow link.

VALIDATION OF NETWORK HOST IN EMAIL

TECHNICAL FIELD

The present disclosure relates generally to a system, method, and computer program product that can validate a network host, such as via a Uniform Resource Locator (URL), a Fully Qualified Domain Name (FQDN), an Internet Protocol (IP) address, or/and another identifier, in a body of an email.

BACKGROUND

Even though a company mail security server can reject or change the contents of an email based on corporate settings and threat analytics when initially received, it does not check the email again after the email has passed the scrutiny. However, a re-evaluation may be required in certain scenarios. For example, vulnerability exists if a server has changed but the FQDN remains the same. Further, the user may need to know whether the network host, e.g., identified by URL, FQDN, or IP address is legitimate or malicious. Additionally, the user may need to know whether the URL is still resolvable.

Currently, the user needs to access another external resource, e.g., a threat analytics platform (also called a threat intelligence platform), an IP reputation database, etc., and import the URL, FQDN, or IP address from the email body to the external resource, to check whether the URL, FQDN, or IP address is valid or legitimate. Thus, a more direct way for checking validity, vulnerability, and/or threat level in an email body is desired.

SUMMARY

Embodiments provide a computer implemented method in a data processing system comprising a processor and a memory comprising instructions, which are executed by the processor to cause the processor to implement the method for transforming text of a network host in the body of the email into a link (e.g., hyperlink) and then validating the link, wherein the link includes one or more of Uniform Resource Locator (URL), a Fully Qualified Domain Name (FQDN), an Internet Protocol (IP) address, and/or another identifier. The method includes: receiving, by an email client, the email; if the threat analytics option is enabled, copying, by the processor, an original body field of the email into a new body field; modifying, by the processor, a text style of the link in the new body field according to a threat analytics result from a threat analytics service; and displaying, by the processor, the email in the new body field, wherein the email includes the link having a modified text style.

Embodiments further provide a computer implemented method, further comprising: adding, by the processor, a mouseover text for the link into the new body field, wherein the mouseover text includes the threat analytics result and a URL of the threat analytics result, wherein the threat analytics result includes a risk score.

Embodiments further provide a computer implemented method, further comprising: adding, by the processor, a new field into the email, and updating, by the processor, the new body field, wherein the new field includes a plurality of parameters including the link, the name of the threat analytics service, the risk score, and a modification of the text style.

Embodiments further provide a computer implemented method, wherein a content type of the new body field is text/html and a multipart subtype of an email message in the new body field is multipart/alternative.

Embodiments further provide a computer implemented method, further comprising: receiving, by the processor, a result whether the link is resolvable from a Domain Name System (DNS) resolver; and modifying, by the processor, the text style of the link in the new body field according to the result from the DNS resolver.

Embodiments further provide a computer implemented method, further comprising: parsing, by the processor, the threat analytics result to obtain a risk score.

Embodiments further provide a computer implemented method, wherein the link is connected to a web page showing the threat analytics result.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

According to embodiments disclosed herein, a method, system, and computer product of validating a network host (e.g., identified by a URL, a FQDN, or an IP address) listed in an email body are provided. In an embodiment, a different style of a link (e.g., the URL, FQDN, or IP address) may be shown in the email body to indicate whether it is malicious or not. For example, if the text color of the link is green, then it indicates that the network host is legitimate, while if the text color of the link is red, then it indicates that the network host is malicious. For another example, if the text of link is bold, then it indicates that the network host is legitimate, while if the text of link is italic, then it indicates that the network host is malicious. In another embodiment, a mouseover text is added for the link in the email body to show a threat analytics result, e.g., a threat level indicated by a risk score.

With the method, system, and computer product of validating a URL, a FQDN, or an IP address in an email body, a user can quickly identify malicious domains and their threat levels through a different style of the link and a mouseover text displayed in the email body. With the method, system, and computer product, it can provide the user with threat information before accessing a malicious network host. This disclosure helps to identify one or more network hosts listed in emails that were good at one point in the past but are currently bad. This disclosure also saves time of the user, because the user does not have to open up a different program/utility or access a new web site in a browser to test the link.

Figure 1:
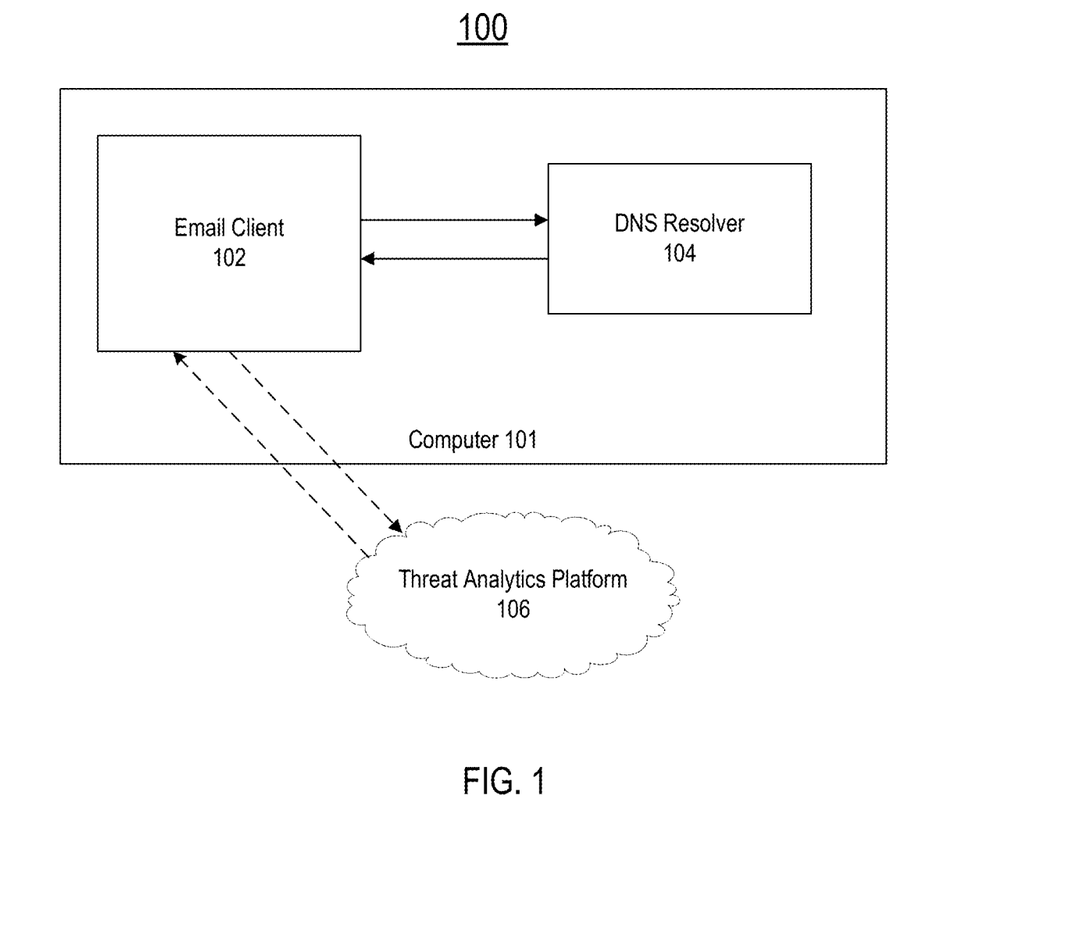
FIG. 1 is a diagram depicting an architecture 100 of validating a network host in an email body, according to embodiments provided herein.

FIG. 1 is a diagram depicting an architecture 100 of validating a URL, a FQDN, or an IP address in an email body, according to embodiments provided herein. As shown in FIG. 1, in an embodiment, email client 102 and Domain Name System (DNS) resolver 104 are implemented on the computer 101. In another embodiment, the DNS resolver 104 can be implemented on a remote server, or can be a cloud-based DNS resolver.

In an embodiment, threat analytics platform 106 is implemented on a remote server, or is a cloud-based platform. In another embodiment, the threat analytics platform 106 can also be implemented on the computer 101 locally.

Figure 2:
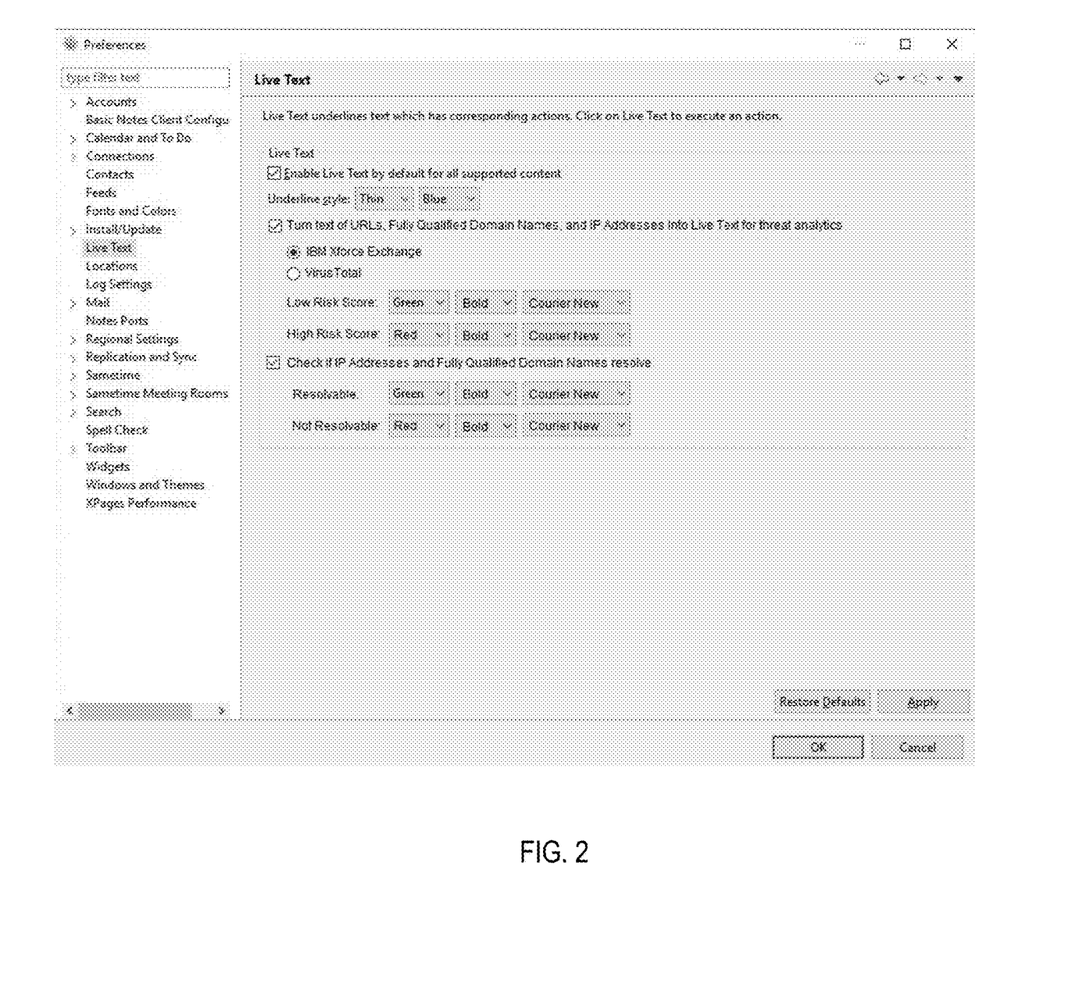
FIG. 2 is a diagram depicting a preferences page of an email client, according to embodiments provided herein.

In an embodiment, the email client 102 can modify a copy of the body field of the email to show threat level information. In the email client 102, as shown in FIG. 2, a preferences page that allows the user to apply a font change, color change, and/or other style change (for example: strike-through or underline, etc.) if certain conditions are applicable. For example, on a preferences page of the email client 102 as shown in FIG. 2, the user can select which threat analytics platform website that will be used for threat detection. In an embodiment, the threat analytics platform can be IBM® X-Force® Exchange, VirusTotal, and the like. If the threat analytics platform option is enabled, the email client 102 has a script that is run each time an email is opened or previewed.

Figure 3:
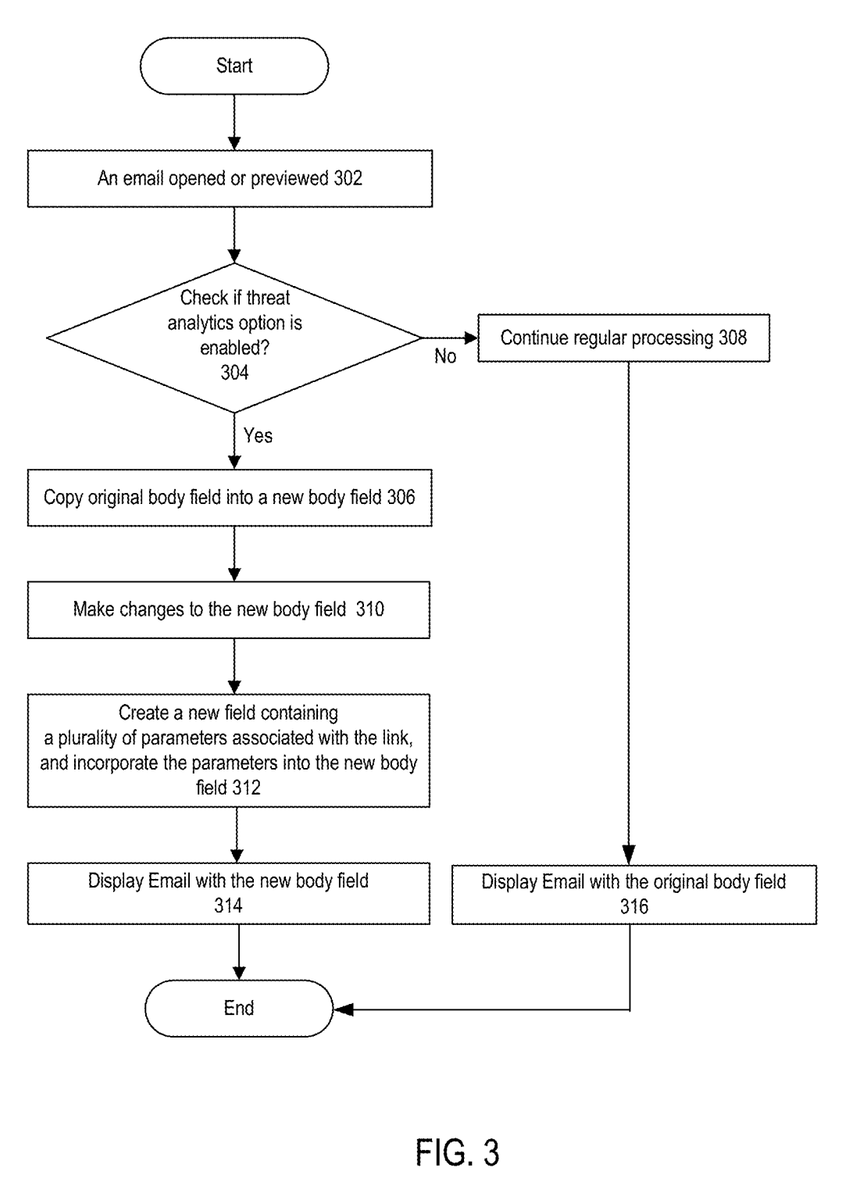
FIG. 3 is a flowchart illustrating a method 300 of validating a network host in an email body, according to embodiments provided herein.

FIG. 3 is a flowchart illustrating a method 300 of validating a URL, a FQDN, or an IP address in an email body, according to embodiments provided herein. At step 302, an email is opened or previewed. At step 304, the script checks if the user choses or enables the option to use threat analytics service. At step 306, if the user choses a threat analytics platform, the script makes a copy of the existing body field to a new body field. At step 308, if the user does not enable threat analytics option, then no threat analytics will be performed, and the email will be processed in a regular way. At step 316, the email is still displayed with the original body field.

At step 310, in the new body field, the script converts one or more network hosts found within the body of the email to links (e.g., hyperlinks) if the network host is currently listed in plain text, so that these links can be connected to a threat analytics platform website for threat analytics service; and then modifies the text style of the links based on the threat analytics result. At step 312, in addition to the new body field, a new field (an object that holds data) is added to the email containing a plurality of parameters including e.g., an element (i.e., the link), a threat analytics platform or an IP reputation database in use, a risk score, and any text style change (e.g., color, font, bold, strike-through, italics, or/and underline, etc.). For example, the new field includes ["www.cnn.com," "IBM_Xforce_Exchange," 1, "green," "bold," "Courier_New"]; ["212.237.0.99," "IBM_Xforce_Exchange," 10, "red," "bold," "Courier_New"]; ["ghost4.examplelab.com," "IBM_Xforce_Exchange," 1, "green," "bold," "Courier_New"].

At step 314, the email is displayed with the new body field. In an embodiment, if the original email body has a Content-Type of plain text or rich text, additional modifications are made to the new body field, so that the plain text or rich text format can be converted to a content type of text/html and the email message can be converted from text to a multipart subtype of multipart/alternative. The new body field is what will be displayed in the email client when the user opens or previews the email. In an embodiment, the original body field is maintained for use in other email clients that are not capable of showing the changes (e.g., threat analytics option disabled). In addition, if any other field, e.g., a corporate defined field including a disclaimer, a footer, and/or a signature, needs to have its original value modified in order for the email to display, a copy of that field will be made so as to retain the original value of that field.

Figure 4:
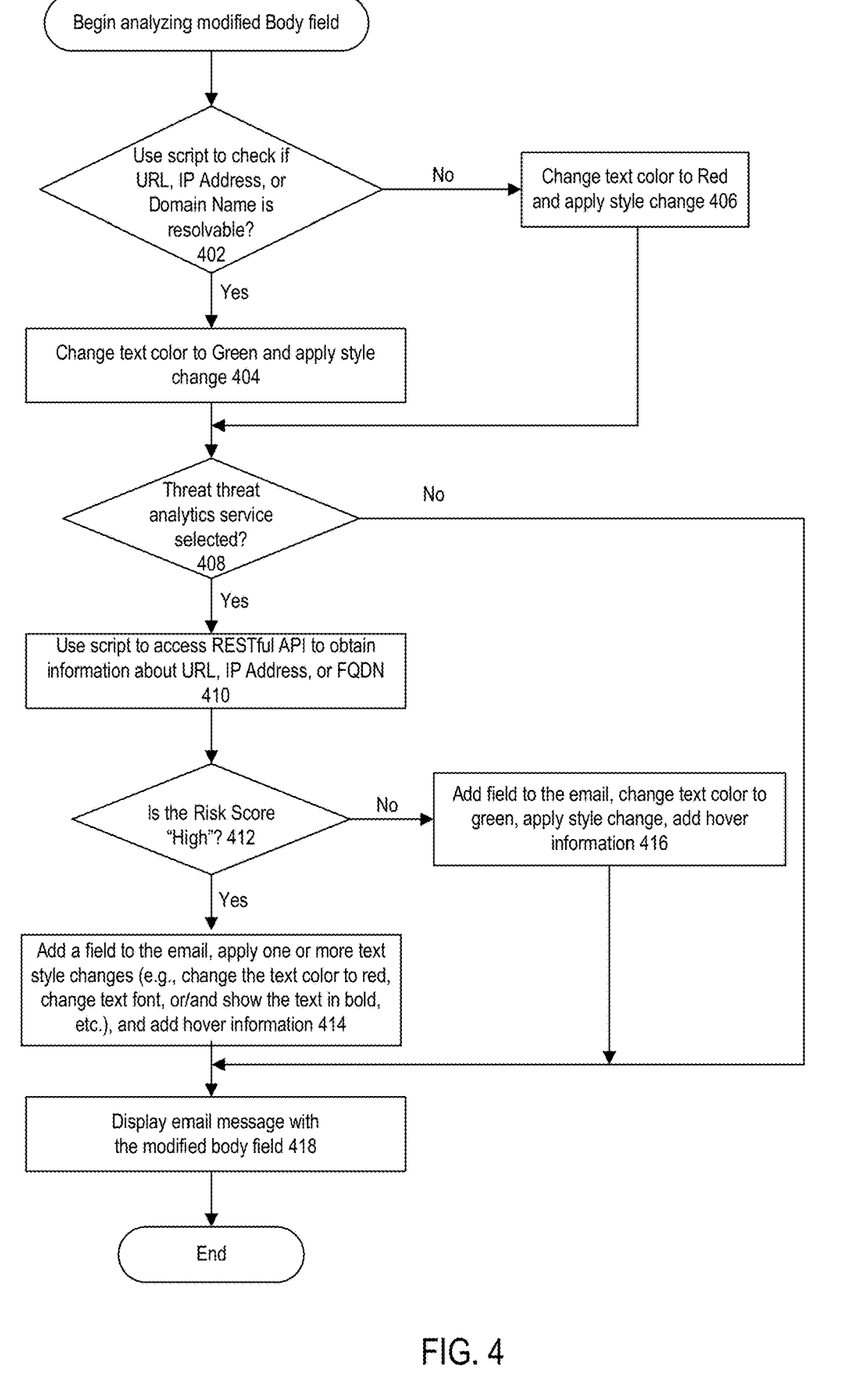
FIG. 4 is another flowchart illustrating a method 400 of validating a network host in an email body, according to embodiments provided herein.

FIG. 4 is another flowchart illustrating a method 400 of validating a URL, a FQDN, or an IP address in an email body, according to embodiments provided herein. At step 402, in the new body field, the script checks if the link is resolvable. On a preferences page of the email client 102 as shown in FIG. 2, if the user enables the option "check if IP Addresses and Fully Qualified Domain Names resolve," referring to FIG. 1, the script will query the local DNS resolver 104 on the same computer 101 where the email client 102 is located. At step 404, if the link is resolvable, the style of the link is changed according to settings on the preferences page of the email client 102. In an example, the text color of the link is changed to green, and the link is bold. At step 406, if the link is not resolvable, the link in the modified body of the email shall be displayed in a different style depending on the font, color, or other style that was set on the preferences page of the email client 102. In an example, the text color of the link is displayed in a red color and bold.

At step 408, the script checks if the user choses or enables the option to use threat analytics service. In an embodiment, if the link is an IP address, the threat analytics service can be provided by a IP reputation database (also called IP Reputation System or IP Reputation Service). The IP reputation database contains a score for each IP address. The score indicates whether the corresponding IP address is a legitimate address or not. The IP reputation database can use any types of database, for instance, MySQL, Oracle, SQL Server, Postgresql, or IBM® DB2. In another embodiment, the threat analytics service can be provided by a threat analytics platform, e.g., IBM® X-Force® Exchange platform.

At step 410, if the user choses to use threat analytics service, e.g., IP reputation database or threat analytics platform, a risk score with regard to the link is provided to the email client 102. In an embodiment, IBM® X-Force® Exchange platform is selected on the preferences page of the email client, the RESTful API in IBM® X-Force Exchange is used to run a GET command (also called a GET method) with HTTP request headers of 'Content-Type' and 'Accept' having values of 'application/json.' The script uses a HTTP response to obtain a threat analytics result in response to the GET command. The HTTP response includes: a status line containing a response code, a group of HTTP headers, and a response body (also called a message body) containing a threat analytics result. The threat analytics result is then parsed to extract a desired element (i.e., the risk score).

At step 412, the script checks whether the risk score is higher than a predefined threat level. If the risk score is higher than the predefined threat level (e.g., 3), then at step 414, a new field is added to the email containing a plurality of parameters including e.g., an element (i.e., the link), a threat analytics platform or an IP reputation database in use, the risk score, and any text style change (e.g., color, font, bold, strike-through, underline, etc.). Moreover, in an embodiment, according to the settings on a preferences page of the email client, the text color of the link is changed to red, and the text of the URL, the FQDN, or the IP address is bolded. Additionally, a mouseover text is added to the new body field, and associated with the link. When the user hovers over the link, a subset of information from the threat analytics platform is displayed to the user. For example, the mouseover text can include the URL of the threat analytics result provided by the threat analytics platform, and the risk score. For another example, the mouseover text can include the URL of an IP reputation database, and the risk score. In an embodiment, if the threat analytics platform is IBM® X-Force® Exchange, the risk score will be displayed when the user hovers over the link. The mouseover text can include additional information from the threat analytics platform. In an embodiment, the link can be associated with the threat analytics result. When the user, e.g., right clicks the link, a web page showing the threat analytics result is opened and provided to the user.

If the risk score is lower than the predefined threat level, then at step 416, in an embodiment, according to the settings on a preferences page of the email client, the text color of the link is changed to green, and the text of the link is bolded. Thus, in this embodiment, a user can easily identify whether a network host listed in the body of the email is legitimate or malicious through the text color and text style of the link.

Figure 5:
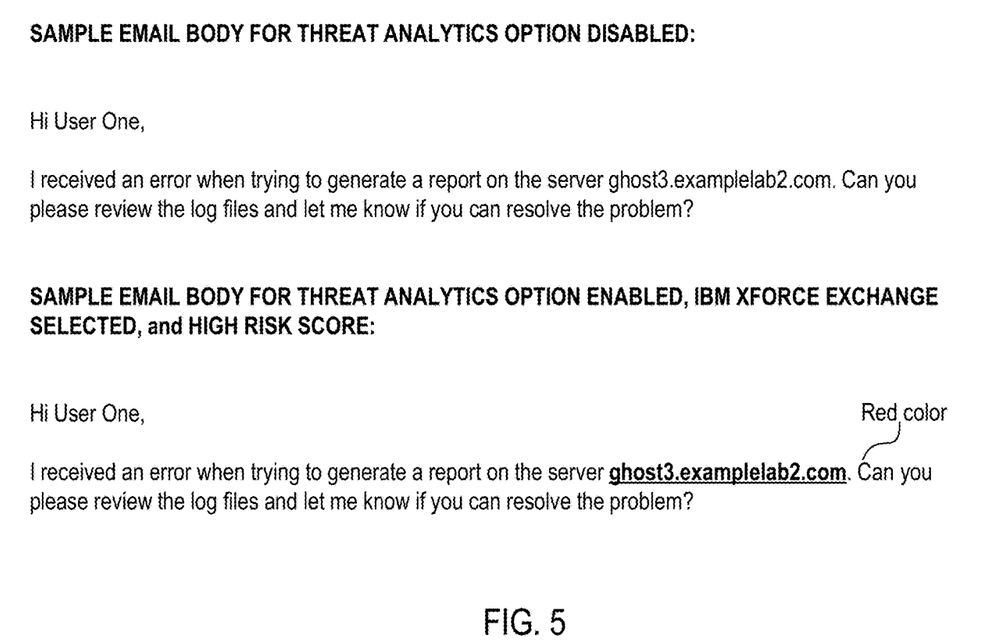
FIG. 5 depicts a comparison between a sample email body without threat analytics and a sample email body with threat analytics, according to embodiments provided herein.
Figure 6:
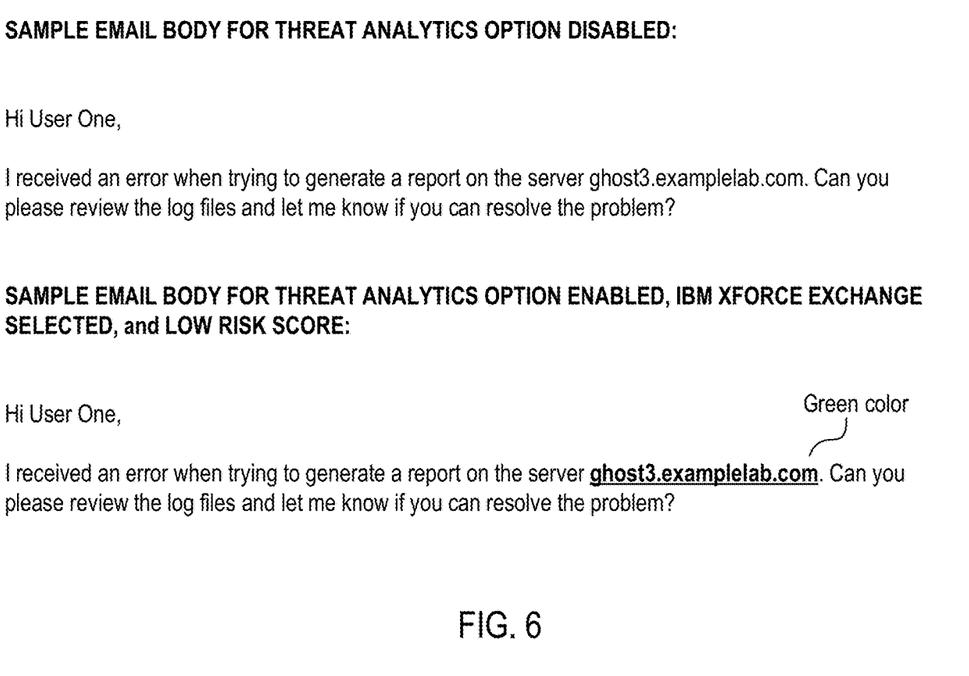
FIG. 6 depicts another comparison between a sample email body without threat analytics and a sample email body with threat analytics, according to embodiments provided herein.
Figure 7:
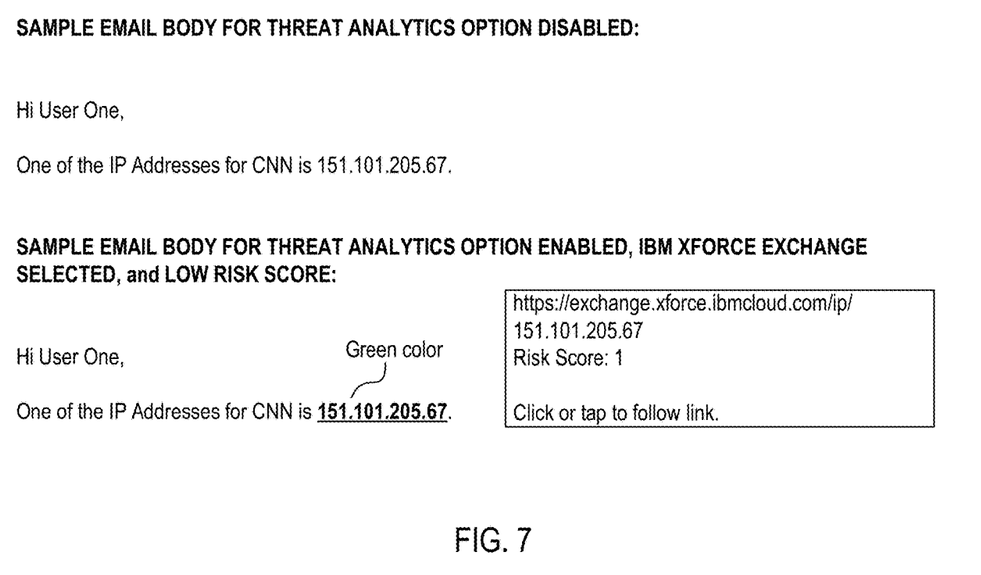
FIG. 7 depicts another comparison between a sample email body without threat analytics and a sample email body with threat analytics, according to embodiments provided herein, wherein a mouseover text is added in the sample email.

At step 418, the email message is displayed with the new body field (i.e., the modified body field). For example, the link can be in red color (as shown in FIG. 5) or green color (as shown in FIG. 6), depending on the threat level of the network host. The link is also bolded. Moreover, a mouseover text is added and associated with the link (as shown in FIG. 7).

Figure 8:
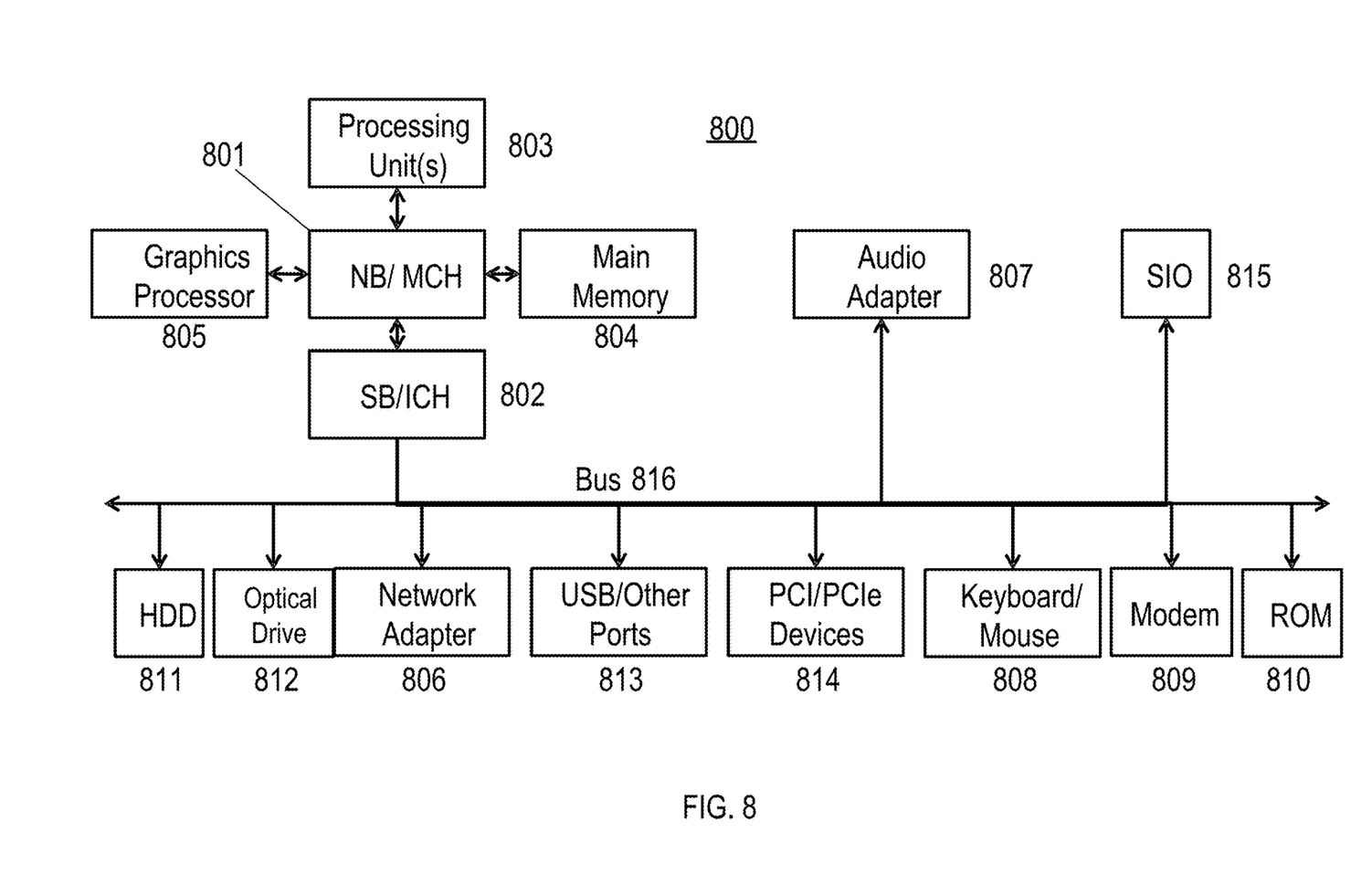
FIG. 8 is a block diagram of an example data processing system 800 in which aspects of the illustrative embodiments are implemented.

FIG. 8 is a block diagram of an example data processing system 800 in which aspects of the illustrative embodiments are implemented. Data processing system 800 is an example of a computer, such as a server or client, in which computer usable code or instructions implementing the process for illustrative embodiments of the present invention are located. In one embodiment, FIG. 8 represents a server computing device, for example the computer 101 which implements the email client 102 and DNS resolver 104 described herein.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through, for example, an accelerated graphics port (AGP).

In the depicted example, a network adapter 806 connects to the SB/ICH 802. An audio adapter 807, keyboard and mouse adapter 808, modem 809, read only memory (ROM) 810, hard disk drive (HDD) 811, optical drive (e.g., CD or DVD) 812, universal serial bus (USB) ports and other communication ports 813, and PCI/PCIe devices 814 may connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. A super I/O (SIO) device 815 can be connected to the SB/ICH 802.

An operating system can run on processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System p® running the Advanced Interactive Executive operating system or the LINUX® operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for implementing a method of validating a network host listed in an email body, described herein, can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or the network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operation steps to be performed on the computer, other programmable apparatus, or other device to produce a computer implemented process, such that the instructions, which execute on the computer, other programmable apparatus, or other device implementing the functions/acts which are specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

I claim:

1. A computer implemented method in a data processing system comprising a processor and a memory comprising instructions, which are executed by the processor to cause the processor to implement the method for validating a network host listed in a body of an email, the method comprising:
receiving, by the processor, the email, wherein the network host comprises a first server at a time of the receiving, wherein the first server is legitimate;
copying, by the processor, an original body field of the email into a new body field;
converting, by the processor, a text representation of the network host into a link in the new body field, wherein the text representation of the network host is the same at the time of receiving and at the time of connecting;
connecting, by the processor, the link to a threat analytics platform website for threat analysis service, wherein the network host comprises a second server and not the first server at a time of connecting, wherein the second server is malicious and the time of connecting occurs after the time of the receiving;
adding, by the processor, a mouseover text for the link into the new body field, wherein the mouseover text includes a URL of a threat analytics result;
modifying, by the processor, a text style of the link in the new body field according to the threat analytics result from the threat analysis service; and
displaying, by the processor, the email with the new body field, wherein the email includes the link having the modified text style.

2. The method as recited in claim 1, wherein the mouseover text further includes the threat analytics result, wherein the threat analytics result includes a risk score.

3. The method as recited in claim 2, further comprising:
adding, by the processor, a new field into the email, and updating, by the processor, the new body field to include the new field, wherein the new field includes a plurality of parameters including the link, a name of the threat analysis service, the risk score, and the modified text style.

4. The method as recited in claim 1, wherein a content type of the new body field is text/html and a multipart subtype of an email message in the new body field is multipart/alternative.

5. The method as recited in claim 1, further comprising:
receiving, by the processor, a result whether the link is resolvable from a Domain Name System (DNS) resolver; and
modifying, by the processor, the text style of the link in the new body field according to the result from the DNS resolver.

6. The method as recited in claim 1, further comprising:
parsing, by the processor, the threat analytics result to obtain a risk score.

7. The method as recited in claim 6, wherein the link is connected to a web page showing the threat analytics result.

8. A computer program product for validating a network host listed in a body of an email, the computer program product comprising a computer readable storage medium having program instructions embodied therewith, the program instructions executable by a processor to cause the processor to:
receive the email, wherein the network host comprises a first server at a time of receipt, wherein the first server is legitimate;
copy an original body field of the email into a new body field;
convert a text representation of the network host into a link in the new body field, wherein the text representation of the network host is the same at the time of receiving and at the time of connecting;
add a mouseover text for the link into the new body field, wherein the mouseover text includes a URL of a threat analytics result;
connect the link to a threat analytics platform web site for threat analysis service, wherein the network host comprises a second server and not the first server at a time of connecting, wherein the second server is malicious and the time of connection occurs after the time of receipt;

modify a text style of the link in the new body field according to the threat analytics result from the threat analysis service; and display the email with the new body field, wherein the email includes the link having the modified text style.

9. The computer program product of claim 8, wherein the mouseover text includes the threat analytics result, wherein the threat analytics result includes a risk score.

10. The computer program product of claim 9, wherein the program instructions executable by the processor further cause the processor to:

add a new field into the email, and update the new body field to include the new field, wherein the new field includes a plurality of parameters including the link, a name of the threat analysis service, the risk score, and the modified text style.

11. The computer program product of claim 8, wherein a content type of the new body field is text/html and a multipart subtype of an email message in the new body field is multipart/alternative.

12. The computer program product of claim 8, wherein the program instructions executable by the processor further cause the processor to:

receive a result whether the link is resolvable from a Domain Name System (DNS) resolver; and modify the text style of the link in the new body field according to the result from the DNS resolver.

13. The computer program product of claim 8, wherein the program instructions executable by the processor further cause the processor to:

obtain the threat analytics result through a RESTful API.

14. The computer program product of claim 13, wherein the program instructions executable by the processor further cause the processor to:

obtain the threat analytics result from a HTTP response in response to a GET command of the RESTful API.

15. A system for validating a network host listed in a body of an email, the system comprising:

a processor configured to:

receive the email, wherein the network host comprises a first server at a time of receipt, wherein the first server is legitimate;

copy an original body field of the email into a new body field;

convert a text representation of the network host into a link in the new body field, wherein the text representation of the network host is the same at the time of receiving and at the time of connecting;

add a mouseover text for the link into the new body field, wherein the mouseover text includes a URL of an IP reputation database;

connect the link to a threat analytics platform web site for threat analysis service, wherein the network host comprises a second server and not the first server at a time of connecting, wherein the second server is malicious and the time of connection occurs after the time of receipt;

modify a text style of the link in the new body field according to a risk score from the IP reputation database; and display the email with the new body field, wherein the email includes the link having the modified text style.

16. The system of claim 15, wherein the mouseover text includes the risk score.

17. The system of claim 16, wherein the processor is further configured to:

add a new field into the email, and update the new body field to include the new field, wherein the new field includes a plurality of parameters including the link, a name of the IP reputation database, the risk score, and a modification of the text style.

18. The system of claim 15, wherein a content type of the new body field is text/html and a multipart subtype of an email message in the new body field is multipart/alternative.

19. The system of claim 15, wherein the processor is further configured to:

receive a result whether the link is resolvable from a Domain Name System (DNS) resolver; and modify the text style of the link in the new body field according to the result from the DNS resolver.

20. The system of claim 16, wherein the processor is further configured to:

check whether a threat analytics option is enabled, if the threat analytics option is enabled, copy an original body field of the email into a new body field;

convert a text representation of the network host into a link in the new body field;

modify a text style of the link in the new body field according to a risk score from the IP reputation database; and display the email with the new body field, wherein the email includes the link having the modified text style.

* * * * *